Feb. 8, 1966 K. GÁNSZKY ETAL 3,234,452

TRANSISTORIZED INVERTER CIRCUIT WITH PROTECTION AGAINST OVERLOAD

Filed June 28, 1962 2 Sheets-Sheet 1

United States Patent Office 3,234,452
Patented Feb. 8, 1966

3,234,452

TRANSISTORIZED INVERTER CIRCUIT WITH PROTECTION AGAINST OVERLOAD

Károly Ganszky and Tibor Kondor, Budapest, Hungary, assignors to Villamosipari Kutato Intezet, Budapest, Hungary, a corporation of Hungary Filed June 28, 1962, Ser. No. 206,019
Claims priority, application Hungary, July 6, 1961, VI–357
13 Claims. (Cl. 321—14)

Figure 1:
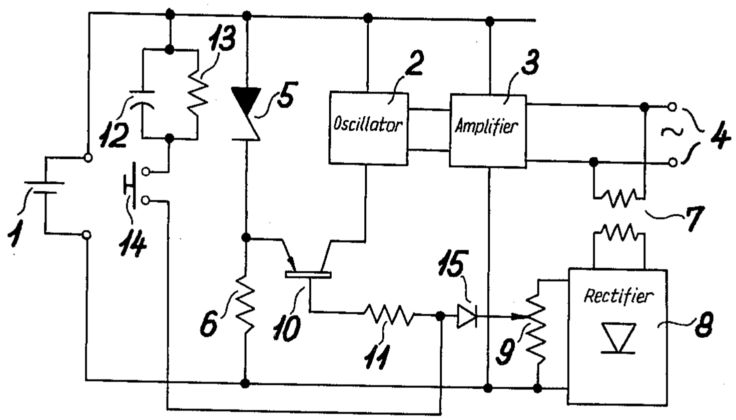

This invention relates to transistorized inverter circuits of the type including oscillator and amplifier stages for transformation of a D.C. input potential into an A.C. output potential. More particularly, the invention relates to inverter circuits of this type including novel means for protecting the transistorized components against damage due to overload.

Where it is desired to transform a D.C. potential into an A.C. potential, it is known to use transistorized inverter circuits having an input connected to a D.C. potential source, such as a battery, and delivering an A.C. output voltage. Where the frequency of the output voltage is to be maintained constant irrespective of any fluctuation in the D.C. input voltage, an oscillator is provided in the circuit to determine and maintain the output frequency. In known arrangements of this type, the inverter includes an oscillator and at least one amplifier stage, with the inverter being fed from a D.C. potential source so as to provide an A.C. output potential having a frequency determined by the oscillator frequency.

In order that the amplitude of the oscillator output will remain constant irrespective of fluctuation in the D.C. input potential, it is necessary to stabilize the D.C. potential applied to the oscillator and this may be effected using a stabilizer circuit, or a stabilizer element, and a resistance connected in series with the latter.

Conventional inverter circuits of this type are difficult to protect aaginst the effects of short circuits and overloads due to the fact that the thermal time constant of the transistors is very slight, so that the transistors are apt to be damaged even with overloads of very short duration.

The object of the present invention is to obviate the above difficulties and to provide a transistorized inverter circuit which is automatically de-activated at a preset output load limit without damage to component parts of the inverter, and including selectively operable means for re-activating the inverter circuit.

In accordance with the invention, activation of the inverter circuit is made dependent upon the A.C. output voltage in such a manner that, when the output voltage decreases below a certain value due to a rise in the output or load current with a resultant drop in the output voltage, the inverter circuit is deactivated. For this purpose, a transistor is included in the supply circuit of either the oscillator or of an amplifier stage, and the A.C. output voltage, or a preset proportion thereof, is compared with the input voltage in such a manner that, when the differential between the two voltages decreases to substantially zero, a blocking potential is applied to the transistor.

Since the output voltage of the inverter is also controlled by the magnitude or amplitude of the D.C. input voltage, the invention inverter circuit is so designed that it is capable of distinguishing whether a decrease in the A.C. output voltage is due to a drop in the input voltage or whether it is due to an increase in the load on the A.C. output circuit. The inverter circuit is de-activated only in the latter case, by means of the protection arrangement. In other words, deactivation of the inverter circuit occurs only when the A.C. output voltage has dropped a predetermined amount with relation to the D.C. input voltage.

For an understanding of the principles of the present invention, reference is made to the following description of typical embodiments thereof as illustrated in the accompanying drawings. In the drawings:

FIGS. 1 through 5 are schematic wiring diagrams illustrating various embodiments of inverter circuits incorporating the invention.

In FIGS. 1 through 5, the same reference characters have been used to identify identical components in each one of the figures.

Referring to FIG. 1, the inverter circuit includes an oscillator 2 and at least one output amplifier 3. The oscillator 2 is supplied from a D.C. potential source 1, such as a battery, for example. The D.C. input voltage to oscillator 2 is stabilized, with respect to input voltage variations, by providing a series connected arrangement of a stabilizer 5 and a series resistance 6, this arrangement being connected in parallel across the input of oscillator 2 and amplifier 3. The oscillator 2 is supplied with the stabilized input potential through a transistor 10 which, when operative, is completely conductive so that there is only a very slight voltage drop thereacross.

It will be noted that the oscillator 2 receives its current through the emitter-collector circuit of transistor 10. The base bias potential for the transistor is comprised of two components. One of these components is the secondary voltage of a transformer 7 having its primary winding connected across the A.C. output circuit 4 of the inverter. This voltage is applied to the base of transistor 10 through a rectifier 8, a voltage divider 9 connected across the rectifier output, and a series resistor 11 connected to the base of transistor 10. The other component comprises the voltage drop across the series resistance 6 due to the current flowing through the stabilizer 5, and which current varies in accordance with variations in the potential of the D.C. input source 1. These two voltage components are arranged in opposition to each other so that the voltage drop across the series resistance 6 is subtracted from the voltage across the voltage divider 9 and which provides the base bias voltage for the transistor 10.

With an increase in the load current, the voltage drop across the voltage divider 9 decreases, since the amplifier 3 always has a predetermined internal resistance. A portion of the voltage drop across the divider 9 is applied in opposition to the voltage drop across the series resistance 6, and this proportion of the voltage drop across the divider 9 likewise decreases with an increase of load current. When that proportion of the voltage drop across divider 9 applied in opposition to the voltage drop across the resistor 6 is substantially equal to the voltage drop across the resistor 6, or when the differential of the two voltages is substantially zero, there is no bias voltage applied to the base of the transistor 10. This blocks the transistor 10 and thus deactivates the oscillator so that the output potential of the inverter is interrupted. The only voltage component then effective is the voltage drop across the series resistance 6, which provides a reverse bias to the base of the transistor 10 to effectively block the latter.

The load current value at which the inverter output is interrupted by virtue of the described protective means does not change with fluctuations in the value of the D.C. input potential for the reason that both the voltage across the series resistance 6 and that on the voltage divider 9 change in proportion to the value of the D.C. voltage, so that the differential is practically always zero for a predetermined load current.

When the inverter output has been interrupted through an overload or a short circuit, operation of the inverter can be restarted by means of a push-button 14. When button 14 is depressed, the transistor 10 is traversed by a current which rapidly decays substantially in accordance with a time constant determined by a capacitance 12 and resistance 11. This will make transistor 10 conductive momentarily so as to re-start the oscillator. Thereby, an output voltage is developed in the circuit 4 and thus the voltage drop across the voltage divider 9 is restored. Should it be found that the overload or short circuit condition still persists at the output 4 upon such re-starting, it indicates that the voltage drop across the voltage divider 9 is inadequate to maintain the transistor 10 conductive. A diode 15 prevents the current traversing the transistor 10 upon closing of the push-button 14 from being shunted through the voltage divider 9. The resistance 13 has a resistance value much higher than that of the resistance 11, and serves only to discharge the capacitance 12 upon release of the push-button 14. The sensitivity level of the protective arrangement can be adjusted by adjusting the sliding contact of the voltage divider 9.

Figure 2:
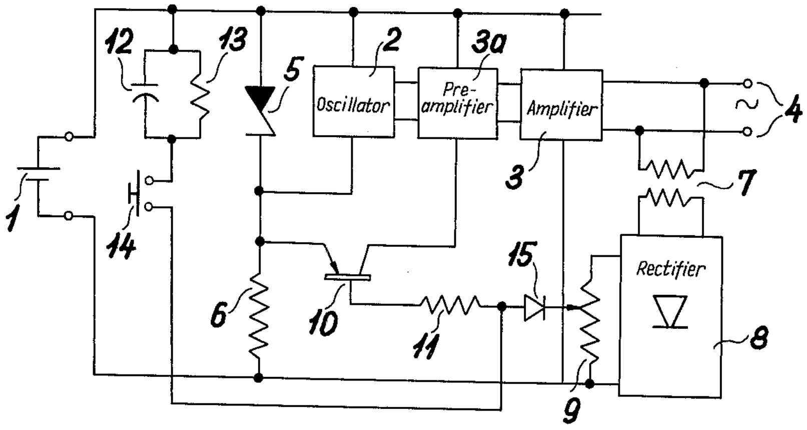

In the arrangement shown in FIG. 2, the transistor 10 is not in the supply circuit of the oscillator 2 but is in the supply circuit of a preamplifier *3a* which, similarly to the oscillator 2, is supplied with a stabilized D.C. input voltage. The preamplifier *3a* is connected between oscillator 2 and the output amplifier 3. In the case of an overload or a short circuit in the output of the inverter, the inverter is deactivated in the same manner as described in connection with FIG. 1 with the difference, however, that after the transistor 10 is blocked, the oscillator 2 will continue to function though inversion is prevented by the blocking of the preamplifier *3a*.

Figure 3:
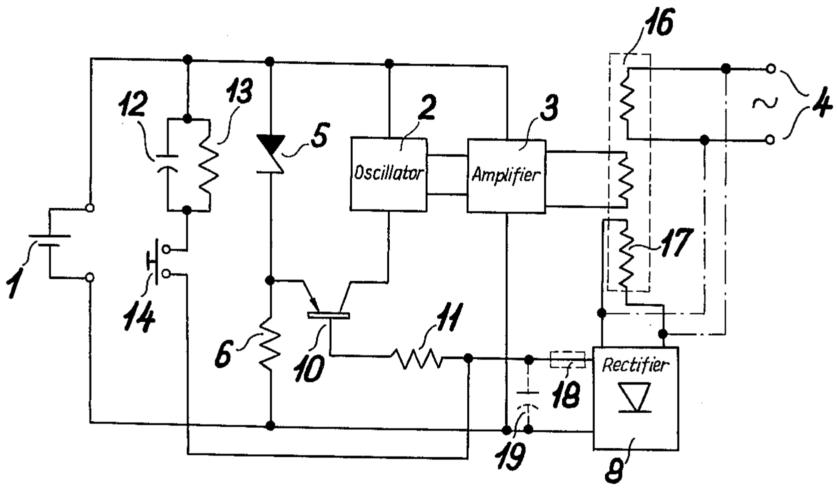

FIG. 3 illustrates another embodiment of the inverter in accordance with the invention. In this embodiment, the output amplifier 3 is coupled to the output circuit 4 through a transformer 16. The signal voltage required to deactivate the inverter may be derived either directly from the output 4, as shown by broken lines connecting the output 4 to the rectifier 8, or from a winding 17 of transformer 16 having a voltage of a suitable value. With the latter configuration, the input and output are electrically disconnected from each other.

In order to reduce any ripple in the voltage derived from the winding 17 as rectified by the rectifier 8, a filter circuit including resistance, inductance and capacitance can be built into the rectifier. An example of this is illustrated in FIG. 3 as including a resistance 18 and a capacitance 19 shown in dotted lines. However, since the speed of response is affected by filter circuits in inverse ratio to the magnitude of the time constants, or, in other words, as the time constant of the filter circuit is increased, the operation of the inverter is discontinued only after a correspondingly increased interval, it is expedient, under more stringent conditions, to reduce the ripple of the rectified feed-back voltage by utilizing a phase-displacing bridge circuit to convert the feed-back voltage into a multiphase voltage.

Figure 4:
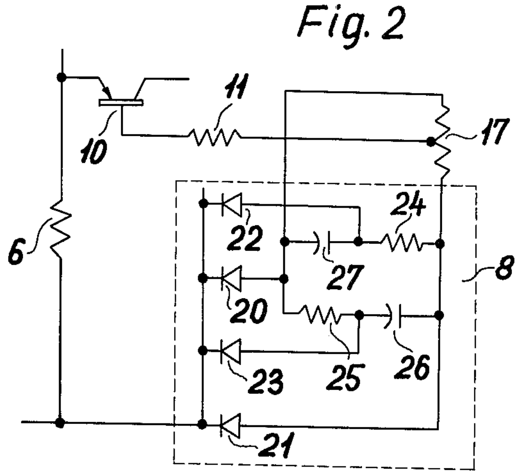

Thus, and referring to FIG. 4, a phase-displacing bridge circuit is provided, including resistance and capacitance members, for attenuating the ripple, and wherein the single phase feed-back voltage is converted into a two-phase voltage. In this case, the secondary winding 17 of the transformer 16 is center tapped. A direct rectification of the voltage of the winding 17 is provided by the diodes 20 and 21, and a rectification of the voltage of the winding 17, with a 90-degree phase displacement, is provided through the diodes 22 and 23 by means of the bridge circuit comprising the resistances 24 and 25 and the capacitances 26 and 27.

Figure 5:
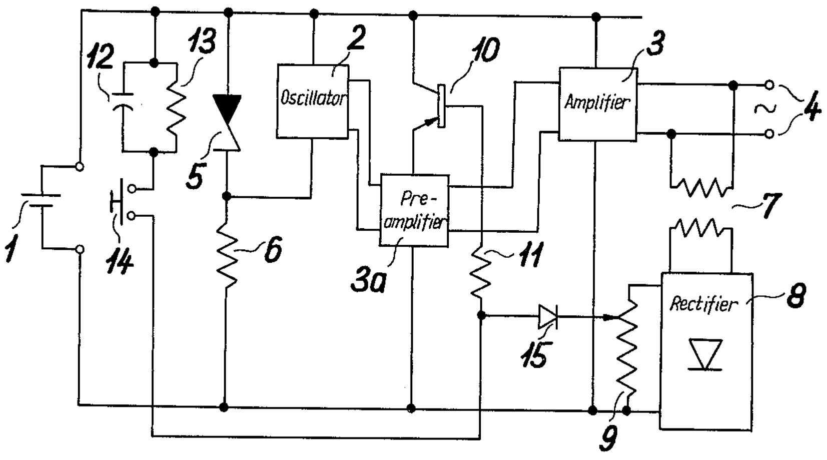

In the embodiment of the invention shown in FIG. 5, the output voltage is compared with the full input voltage and either the oscillator or the output amplifier means is connected in the emitter circuit of transistor 10. In the arrangement specifically illustrated, the preamplifier *3a* is supplied directly from the input 1 and is connected directly in the emitter circuit of transistor 10.

The base bias potential, required to make the transistor 10 conductive, again comprises two components. One of these components, as in the embodiments previously described, is derived from the output 4 and rectified by the rectifier 8, and may be filtered either by a filter circuit or by a phase-displacing bridge circuit in the manner previously described. The value of this component may be adjusted by the setting of the voltage divider 9.

The other component comprises a voltage proportional to the input voltage and which is applied to the load in the emitter circuit of the transistor 10. In the particular example illustrated, this load comprises the preamplifier *3a*.

The two voltage components are in opposition to each other. Thus, the voltage drop across the preamplifier *3a*, acting as a load resistance, is subtracted from the voltage supplied from the rectifier 8 and applied across the voltage divider 9. When the voltage drop across the voltage divider 9, which decreases simultaneously with an increase in the load current, becomes equal to the voltage across the preamplifier *3a*, the blocking of transistor 10 is initiated so as to block the current flow therethrough. Thus, the voltage drop across the preamplifier *3a*, which constitutes the load in the emitter circuit, and the output voltages of the further stages, such as the voltage at the output 4 of the output amplifier 3 driven by the preamplifier *3a*, are also decreased. As a result, the blocking of the transistor 10 and the deactivation of the inverter occurs in the form of surges.

While specific embodiments of the invention have been shown and described in detail to illustrate the application of the principles of the invention, it will be understood that the invention may be embodied otherwise without departing from such principles.

What is claimed is:

1. A transistorized inverter circuit comprising, in combination, output amplifier means; an input circuit connected to said amplifier means to provide a D.C. input potential thereto; an A.C. output circuit connected to said amplifier means; an oscillator connected to said input circuit and to said amplifier means to determine and control the output frequency; a transistor having its output connected between said input circuit and one of said amplifier means and said oscillator and controlling the flow of input current to said one of said amplifier means and said oscillator; comparison means operable to apply a first voltage, corresponding to the potential across said output circuit, in opposition to a second voltage, corresponding to the input potential, to derive the differential between said voltages; and circuit means operable to apply said differential as a bias voltage to trigger said transistor conductive; whereby, when said differential becomes substantially zero, said transistor is blocked to deactivate said inverter circuit.

2. A transistorized inverter circuit, as claimed in claim 1, in which said differential corresponds to the value of said first voltage less the value of said second voltage.

3. A transistorized inverter circuit, as claimed in claim 2, in which said circuit means includes means operable, upon disappearance of said output voltage due to deactivation of said inverter circuit, to apply said second voltage to said transistor to reverse bias the latter.

4. A transistorized inverter circuit, as claimed in claim 1, in which said comparison means comprises a rectifier connected across said output circuit, a voltage divider connected across the output of said rectifier and supplying said first voltage, and a series resistance connected across said input circuit and to the emitter of said transistor, and supplying said second voltage.

5. A transistorized inverter circuit, as claimed in claim 1, in which said comparison means includes a rectifier connected across said output circuit and a voltage divider connected across the output of said rectifier and supplying said first voltage as a bias voltage to trigger said transistor conductive; said comparison means further including one of said oscillator and said output amplifier means connected in the emitter circuit of said transistor and supplying said second voltage in a direction to block said transistor.

6. A transistorized inverter circuit, as claimed in claim 1, including means connected to said input circuit and to said transistor and selectively operable, when said inverter circuit is deactivated, to provide a momentary current surge through said transistor to restore the output potential.

7. A transistorized inverter circuit, as claimed in claim 6, in which said comparison means includes a voltage divider supplying said first voltage; and means isolating said voltage divider from said current surge.

8. A transistorized inverter circuit, as claimed in claim 1, including a transformer having its primary winding connected across said output circuit; said comparison means being connected to said secondary winding to derive said first voltage corresponding to the output potential; said transformer isolating the input circuit from said output circuit.

9. A transistorized inverter circuit, as claimed in claim 1, including a transformer having a primary winding connected to the output of said output amplifier, a first secondary winding connected to said output circuit, and a second secondary winding connected to said comparison means to derive said first voltage corresponding to the output potential; said transformer electrically isolating said input circuit from said output circuit.

10. A transistorized inverter circuit, as claimed in claim 1, in which said comparison means includes a rectifier supplying said first voltage to bias said transistor conductive; and filter means connected in the output circuit of said rectifier to attenuate ripples in the rectified voltage supplied to said transistor.

11. A transistorized inverter circuit, as claimed in claim 1, in which said comparison means includes a phase-displacing bridge connected to said output circuit and supplying said first voltage corresponding to the output potential.

12. A transistorized inverter circuit, as claimed in claim 1, in which said transistor is connected in the supply circuit of said oscillator.

13. A transistorized inverter circuit, as claimed in claim 1, in which the emitter of said transistor is connected through said one of said amplifier means and said oscillator to said input circuit; a voltage divider; means for impressing across said voltage divider a potential corresponding to the potential across said output circuit; and means for applying at least a portion of the voltage across said voltage divider to the base of said transistor.

References Cited by the Examiner

UNITED STATES PATENTS

| | | | |
|---|---|---|---|
| 2,959,745 | 11/1960 | Grieg | 321—2 |
| 2,968,738 | 1/1961 | Pintell | 321—2 |
| 3,004,206 | 10/1961 | Sheffet | 321—2 |
| 3,012,205 | 12/1961 | Brown | 321—11 |
| 3,046,412 | 7/1962 | Seike | 321—14 |

LLOYD McCOLLUM, *Primary Examiner.*

G. J. BUDOCK, J. C. SQUILLARO, *Assistant Examiners.*